US00RE42965E

(19) United States
(12) Reissued Patent
Larson et al.

(10) Patent Number: US RE42,965 E
(45) Date of Reissued Patent: Nov. 29, 2011

(54) ANTI-SLIP OVERSHOE

(75) Inventors: Jon C. Larson, Grand Forks, ND (US); Van B. Larson, Grand Forks, ND (US)

(73) Assignee: Sure Foot Corporation, Grand Forks, ND (US)

(21) Appl. No.: 11/566,779

(22) Filed: Dec. 5, 2006

Related U.S. Patent Documents

Reissue of:
(64) Patent No.: 6,836,977
Issued: Jan. 4, 2005
Appl. No.: 10/314,913
Filed: Dec. 9, 2002

U.S. Applications:
(63) Continuation-in-part of application No. 09/648,920, filed on Aug. 25, 2000, now abandoned.

(51) Int. Cl.
*A43B 3/16* (2006.01)
(52) U.S. Cl. ..... 36/59 R; 36/7.6; 36/7.3
(58) Field of Classification Search ..... 36/59 R, 36/7.6, 7.3, 135, 7.4, 7.7, 59 C
See application file for complete search history.

(56) References Cited

U.S. PATENT DOCUMENTS

| | | | | | |
|---|---|---|---|---|---|
| 1,070,951 | A | * | 8/1913 | Elliot | 36/7.6 |
| 1,954,761 | A | | 4/1934 | Wiggin | |
| 2,292,239 | A | | 8/1942 | Pierce et al. | |
| 2,300,091 | A | * | 10/1942 | Barry | 36/7.7 |
| 3,006,085 | A | * | 10/1961 | Bingham, Jr. | 36/59 C |
| D203,577 | S | * | 2/1966 | Weinberg | D2/957 |
| 3,507,059 | A | * | 4/1970 | Vietas | 36/59 R |
| 3,597,863 | A | | 8/1971 | Austin et al. | |
| 3,619,916 | A | * | 11/1971 | Neri | 36/59 R |
| 3,775,874 | A | | 12/1973 | Bonneville | |
| 4,045,888 | A | * | 9/1977 | Oxenberg | 36/114 |
| 4,318,231 | A | | 3/1982 | Simoneau | |
| 4,653,206 | A | * | 3/1987 | Tanel | 36/126 |
| 5,203,097 | A | * | 4/1993 | Blair | 36/59 C |
| 5,315,767 | A | * | 5/1994 | Bradbury | 36/7.1 R |
| 5,689,901 | A | * | 11/1997 | Bell et al. | 36/7.6 |
| 5,813,143 | A | * | 9/1998 | Bell et al. | 36/59 R |
| 5,921,005 | A | * | 7/1999 | Bell et al. | 36/59 R |
| 6,154,982 | A | * | 12/2000 | Bell et al. | 36/7.6 |

FOREIGN PATENT DOCUMENTS

| | | |
|---|---|---|
| EP | 0250634 | 1/1988 |
| GB | 2265539 A | 10/1993 |
| JP | 10042901 | 2/1998 |

* cited by examiner

*Primary Examiner* — Ted Kavanaugh
(74) *Attorney, Agent, or Firm* — Robert D. Atkins; Patent Law Group

(57) ABSTRACT

An overshoe that is removably disposable on a user's shoe and provides a tread surface that enhances the user's footing on slippery surfaces. The tread surface has removable spikes that penetrate surfaces and forward-oriented and rearwards-oriented gripping ridges that grip the surface. The ease of pulling on and removing the overshoe is enhanced by using stretch zones that are placed to allow stretching of the overshoe to fit over a shoe or the like without compromising the snugness of the overshoe fit. A spike assembly for use with an overshoe that fits over a person's shoe and enhances a person's contact with the ground, includes a spike having a head operably coupled to a shank; and a button overmolded on the spike and having a neck for removable engagement in a bore defined in the overshoe. A method of minimizing slippage on a ground surface is further included.

43 Claims, 17 Drawing Sheets

ANTI-SLIP OVERSHOE

Matter enclosed in heavy brackets [ ] appears in the original patent but forms no part of this reissue specification; matter printed in italics indicates the additions made by reissue.

*CLAIM TO DOMESTIC PRIORITY*

*The present application is a reissue of U.S. patent application Ser. No. 10/314,913, now U.S. Pat. No. 6,836,977, filed Dec. 9, 2002.*

*CROSS-REFERENCE TO RELATED APPLICATIONS*

*More than one reissue application has been filed for the reissue of U.S. Pat. No. 6,836,977. The reissue applications are application Ser. Nos. 11/566,779, filed Dec. 5, 2006, and 12/713,075, filed Feb. 25, 2010, all of which are reissues of U.S. Pat. No. 6,836,977.*

RELATED APPLICATION

This application is a continuation-in-part of application Ser. No. 09/648,920 filed Aug. 25, 2000 now abandoned.

TECHNICAL FIELD

The present invention is related to the field of footwear worn over other footwear. More particularly, the present invention relates to anti-slippage footwear and to a spike assembly for use with such footwear.

BACKGROUND OF THE INVENTION

Shoes, including athletic shoes, work boots, dress shoes, ski boots, overshoes, and all manner of footwear, provide poor traction on many surfaces, including slippery, icy, and wet surfaces. The difficulties of moving across a slippery surface, including walking, running, and jogging, result in inconvenience and injury. Slips, falls, and resultant injuries are typically caused by a lack of good footing. And even if a person does not actually fall, the need to walk slowly or with small steps over a slippery surface is inconvenient, slows movement, and is a distraction that interferes with a person's ability to be aware of their surroundings and to be alert to non-slip hazards.

The inconvenience of walking on slippery surfaces interferes with businesses that require outdoor work to be done when conditions are icy. Postal and parcel delivery, for instance, is hampered, as well as baggage handling, road repair, ambulance and emergency work, police work, and any outdoor work that cannot be stopped for inclement weather.

Runners, joggers, and persons that exercise outdoors are hampered by the loss of traction on slippery surfaces. For example, even if outdoor surfaces are slightly slippery, a jogger must take smaller strides to avoid slipping. Activities that require movement faster than a slow walk are greatly hindered in inclement conditions by a lack of suitable footwear.

Further, even the knowledge that roads and sidewalks are slippery can be detrimental. The knowledge that outdoor walking conditions are hazardous may discourage persons from engaging in normal activities. For instance, a person is more likely to choose not to walk to a store, to take a pet for a walk, or otherwise leave home if the person knows that walking conditions are slippery.

This problem is especially acute for the elderly or persons with disabilities that interfere with a standard gait. Many elderly persons experience impediments to walking that make them more likely to slip and fall under normal conditions; and in climates where snow and ice persists through a significant portion of the winter, some elderly persons become essentially home-bound. Similarly, a disability that causes an irregular gait may discourage a person from undertaking normal activities when outdoor walkways provide subpar traction; for example, the loss of a leg may create an irregular gait that leads to added vulnerability to slipping.

Ideally, footwear that provides good traction in all weather would minimize the inconvenience of changing or removing shoes every time a person comes indoors. Further, a device that is versatile and works with many size shoes or foot-sizes is desirable so that a user, especially an organization that serves multiple persons, may stock a minimal number.

SUMMARY OF THE INVENTION

The invention solves the difficulties described above by providing footwear that is worn over other footwear, and is referred to herein as an overshoe. The overshoe easily slips on and off of shoes and provides excellent grip and traction on slippery surfaces. The improvement in grip and traction results in greater safety, efficiency, and confidence for a person moving across a surface. Walking or jogging is safer and the wearer of the overshoe may move with an increased stride length that is faster and more comfortable.

The overshoe has spikes that help the wearer have grip and traction on a surface; the weight of the wearer pushes the spikes into the surface so that they grip. The spikes may be made of a durable material—for instance, carbide—which resists wear and maintains a sharp point, or stainless steel. The spikes are under the heel, the ball of the foot, and forward and rearward of the ball of the foot. Thus, they are arranged so that the heel or the ball of the foot pushes spikes into the ground while walking. The forwardmost spike is pushed into the ground when the user's weight is shifted far forward—for example when running, standing on tip-toe, or leaning back with the toes pointed—a position that is naturally assumed in some situations, for instance when leaning far back while pulling a rope tied to a heavy object.

The spikes may be readily removed from the overshoe for use on surfaces that might be damaged by the spikes. Readily removing the spikes facilitates worn spike replacement, and is a safety feature that, for instance, allows a user to be freed when a spike is inadvertently wedged into a crevice in a rigid surface. As will be appreciated, the overshoe has gripping features in addition to the spikes. These features enhance traction and a user may wear the overshoe without the spikes and enjoy greatly increased traction, although maximum traction on ice is achieved with the use of the spikes. Removing the spikes is particularly useful when the overshoe is worn indoors as many household surfaces would be damaged by the spikes.

The material of the overshoe is a durable elastic material that is tough, light-weight, and flexible even in temperatures below 0° F. The term "elastic material," as used herein, includes natural and synthetic polymers, including rubbers and reinforced rubbers, TRP, and other suitable materials.

The overshoe has a front-gripping portion that substantially encloses and grips the front toe portion of the user's shoe and a back-gripping portion that grips the back heel portion of a user's shoe. The front-gripping portion of the overshoe has an opening that accepts the user's shoe; this opening is formed in the overshoe and stays open, and therefore does not have to be held open. The user may insert the user's shoe into the opening and stretch the front-gripping portion to fit around the shoe's front. The back-gripping portion is similarly stretched around the back of the shoe to provide a secure fit. The overshoe is preferably made available in several sizes to accommodate a wide range of shoe sizes over which the overshoe is to be worn.

The back-gripping portion includes a hole that allows the overshoe to be easily put on a shoe. A user may insert a finger into a finger hole and easily stretch the overshoe by pulling. This feature is especially useful for users with limited use of their hands or reduced strength, including disabled, arthritic, and elderly persons. This feature is superior to a tab or a tab-type feature because the finger hole does not require a grip; it merely requires that the finger hole be hooked with a finger or implement.

The overshoe has an outersole that joins the front- and back-gripping portions. The top of the outersole contacts the user's shoe and the bottom is the tread surface; the spikes project from the tread surface, which also has gripping ridges.

The gripping ridges work with the spikes to provide extra traction and increase the coefficient of friction between the outersole and the surface. The gripping ridges may have a triangular shape: one side of the triangle is a push-face that is vertical to the walking surface, generally referred to as the ground herein; and another side of the triangle, the hypotenuse face, slopes back to the outersole surface and serves as a brace to the push-face. The push-face may be a forward-pushing push-face that is oriented to the front of the oversole so that it directly resists forces that tend to pull the overshoe forward. Or the push-face may be a backward-pushing push face that faces the rear of the oversole and provides a surface that resists forces that move the overshoe backward. The triangular shape distributes the force effectively to provide strength, durability, and surface area to resist movement.

The overshoe is configured so that it fits snugly and conforms to the shape of the shoe but is easy to put on and remove. The shoe material ideally is elastic so that it may be stretched by applying tension, but returns to its original shape when the tension is removed. Thus, the overshoe may be stretched by a user to fit around a shoe and its elastic force provides for a snug fit that conforms to the user's shoe. If the material is too easily stretched, however, it stretches and moves while the user is walking so that walking is more difficult. The invention reconciles these competing design needs by strategically incorporating stretch zones into the overshoe. The stretch zones are placed so that the overshoe is readily stretched by a user in the course of putting on or removing the shoe.

The stretch zones are placed in the front-gripping portion and in the back-gripping portion so that these portions may be readily stretched by the user. A stretch zone is a portion of the overshoe that is made in the shape of a narrow strip: since the ease of stretching the plastic is proportional to its cross-sectional area—the product of the zone width and thickness—control of the zone's cross-sectional area allows for control of its stretch; a small area increases stretchability. But the cross-sectional area of the zone is related to the durability and longevity of the stretch zone; a larger area increases longevity. The zones are created by introducing holes or cut-outs that reduce the amount of plastic in the overshoe. The invention includes placing these zones in areas that need to be stretched to fit over a shoe but restricting their use in overshoe areas that experience stretching loads during a user's movement. The need for ease in stretching these zones must be balanced against the need for durability and strength.

The incorporation of the stretch zones increases the versatility of the overshoe. Since the overshoe can be more readily stretched by a user than would otherwise be possible, the overshoe may be stretched to fit around a greater variety of shoe sizes. Therefore a user may accommodate all of their shoes with a minimal number of overshoes. The placement of the stretch zones allows for a better fit and for a better stretchability when the user needs it: stretchability is great when the overshoe is being put on but small when it is being worn.

The outer sole has a forward portion, a central opening, and a rearward portion. The forward portion generally underlies the front of the shoe and the rearward portion generally underlies the heel of the user. The central opening is an opening between the forward and rearward portions. The central opening minimizes the amount of material used to form the overshoe and avoids creating a space between the outersole and user's shoe that could trap unwanted material such as ice, mud, and rocks.

In an embodiment of the rearward portion of the outer sole, the rearward portion is a band of material that includes both gripping ridges and spikes. It has a surface area that contacts the ground. The rearward portion of the present invention has a rearward portion that is improved over the prior art because it has a greater surface area and has an increased thickness. Furthermore, the increased thickness allows for a plurality of gripping ridges to be incorporated so that traction is greatly improved compared to a narrower rearward portion.

The overshoe has a greater thickness in critical areas. Other anti-slip overshoes have a thickness that is essentially uniform throughout. This makes it easier to mass-produce the prior art overshoes, but the durability of such overshoes is compromised. The longevity of the overshoe of the present invention has been improved by adding extra material thickness at key areas. For instance, the rearward portion is thicker than most of the rest of the outersole; this increased thickness improves the longevity of the rearward portion. The areas around the spikes are also reinforced with extra thickness; the extra thickness increases the longevity of the overshoe because the hard material of the spikes, such as metal, tends to cause the material of the overshoe to wear down. Other areas of increased thickness are generally the stretch zones. Manipulating the thickness of the stretch zones allows their cross-sectional area to be optimized to balance longevity with stretchability.

The invention is further a spike assembly for use with an overshoe that fits over a person's shoe and enhances a person's contact with the ground and includes a spike having a head operably coupled to a shank and a button overmolded on the spike and having a neck for removable engagement in a bore defined in the overshoe.

DETAILED DESCRIPTION OF THE PREFERRED EMBODIMENT

Figure 1:
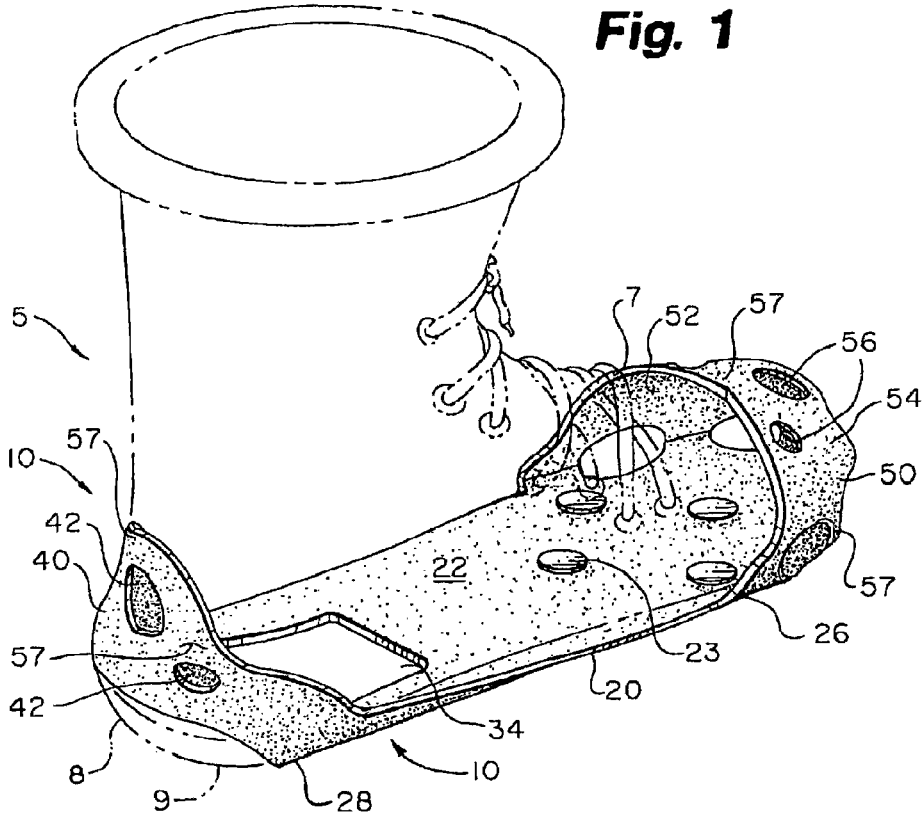
FIG. 1 is a perspective view of an anti-slip overshoe attached to a shoe that is shown in phantom.

The overshoe of the present invention is shown generally at 10 in the figures. The overshoe 10 is configured to fit around exemplary shoe 5. Shoe 5 may be any manner of footwear, including but not limited to shoes, boots, ski-boots, and athletic shoes. Shoe 5 has a forward toe portion 7, a heel portion 8, and a bottom 9. Forward toe portion 7 accommodates the user's toes and the ball of the foot. Heel 8 accommodates the user's heel, and bottom 9 of shoe 5 contacts the ground when the overshoe 10 is not being used. The user walks or moves on the ground, such movement including walling, jumping, running, jogging, and similar movement.

The overshoe 10 has a front-gripping portion 50, a back-gripping portion 40, and an outersole 20. The front-gripping portion 50 grips the forward toe portion 7 of shoe 5 and back-gripping portion 40 grips the heel portion 8 of shoe 5. The overshoe 10 has an outersole 20 that joins the front-gripping portion 50 and back-gripping portion 40.

The outersole 20 has a forward portion 26, a rearward portion 28, a central opening 34, a top 22, and a tread surface 24. The forward portion 26 is generally disposable under the forward toe portion 7 of the shoe 5 and is continuous with the rearward portion 28, which is generally disposed under heel 8 of shoe 5. Forward portion 26 and rearward portion 28 together define central opening 34. The top of the outersole 22 generally contacts the bottom of shoe 9 and the opposing bottom of the outersole is tread surface 24.

Spikes 25 project downward from tread surface 24. The spikes 25 may be carbide, stainless steel, or other suitable materials. The spikes 25 may additionally be conventional golf spikes as used in conjunction with golf shoes. Such spikes 25 are especially useful where the overshoe 10 is intended for use in areas of grass and dirt. The spikes 25 are set in a spike assembly that has a top 23 in the top of the outersole 20 and are replaceable by the user. The spike assembly is disposed in a bore 23 (see FIGS. 3a and 4a) formed in the material forming overshoe 10.

Figure 4:
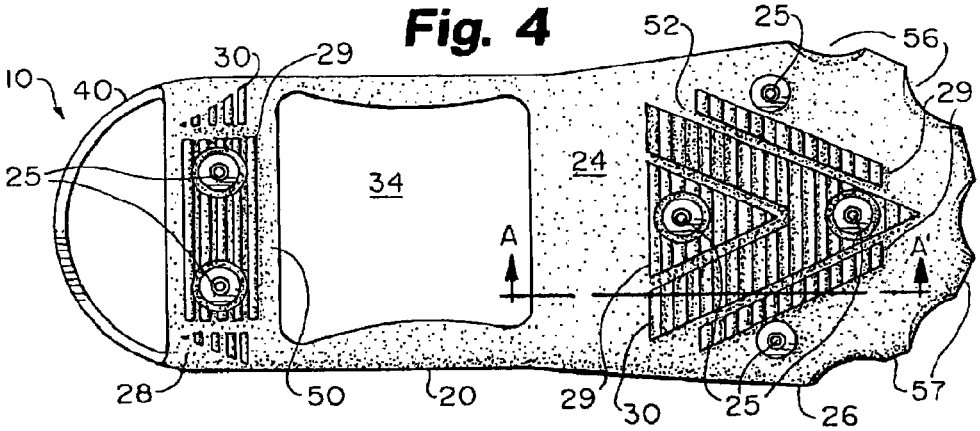
FIG. 4 is a bottom plan view of an anti-slip overshoe.

The splices 25 may be arranged in the outersole forward portion 26 as shown in FIG. 4. For example, the spikes 25 may be arranged as a four-spike diamond shape with one spike 25 approximately on the longitudinal axis of the outersole 20, in a position more forward than the other three spikes 25 and slightly forward of the ball of the foot. The spike 25 on the opposing corner of the diamond is on the same axis and is more rearward than the other three spikes 25 and to the rear of the ball of the foot. The other two spikes 25 are disposed approximately beneath the ball of the foot and placed closer to the outer edge of tread surface 24. Two additional spikes 25 may be placed in rearward portion of outersole 28 (FIG. 4). These two spikes 25 are disposed to be approximately under the user's heel.

Figure 3:
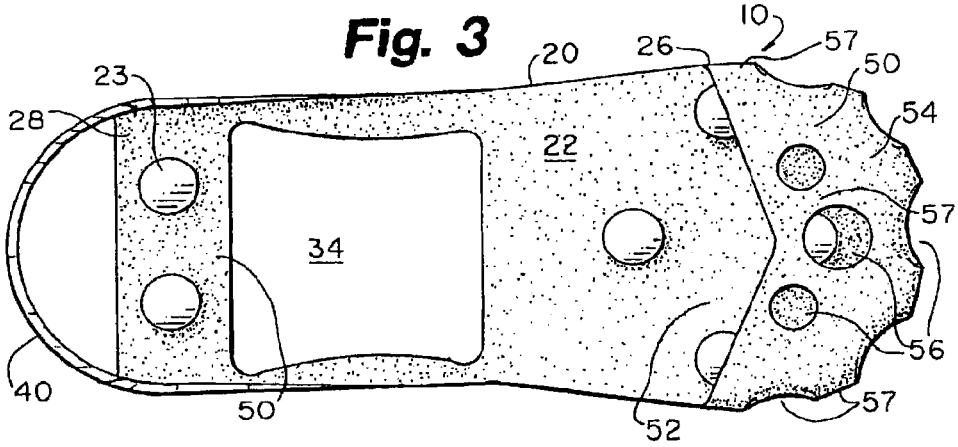
FIG. 3 is a top plan view of an anti-slip overshoe.
Figure 3A:
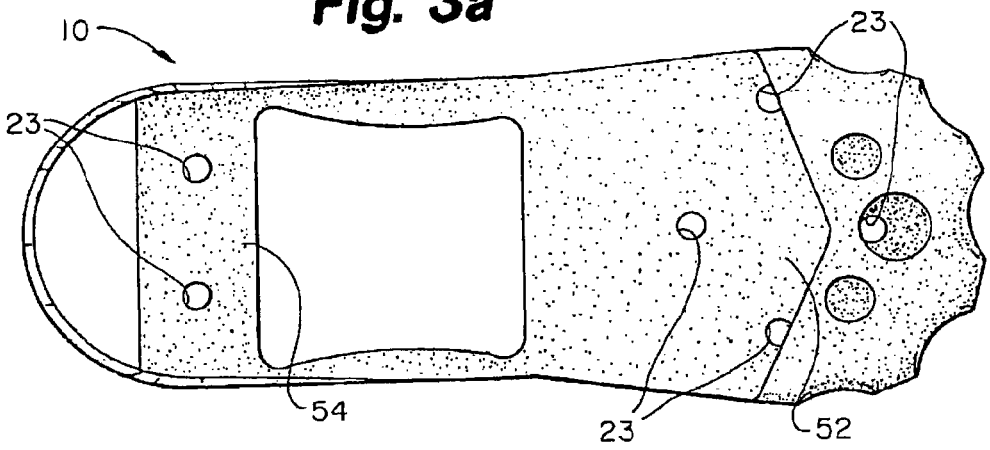
FIG. 3a is a top plan view of an anti-slip overshoe with spikes removed.
Figure 4A:
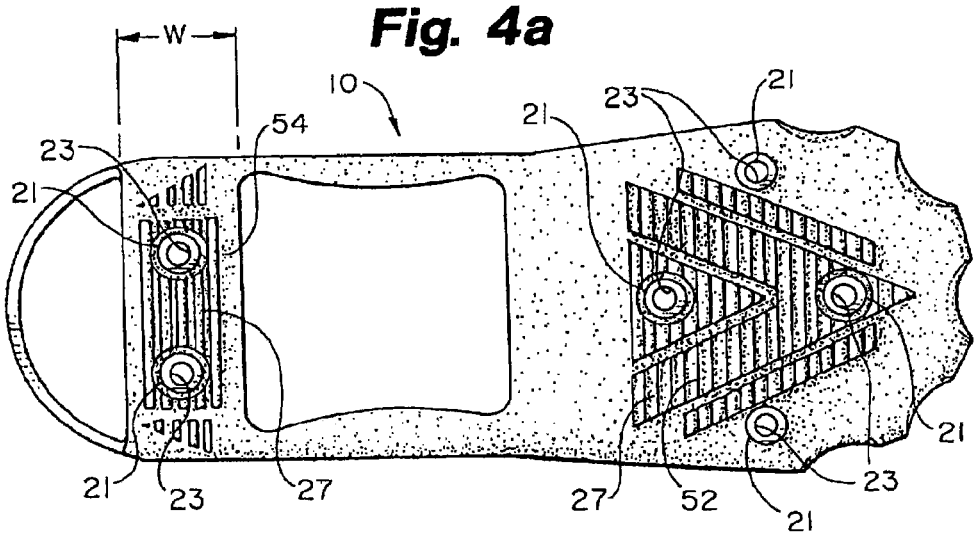
FIG. 4a is a bottom plan view of an anti-slip overshoe with spikes removed.

FIGS. 3a and 4a depict the overshoe 10 with spikes 25 removed from the bores 23. The removal may be removed for replacement of the spikes 25. Further, the spikes 25 are readily removed for use on surfaces that would otherwise be marked by the spikes 25. FIGS. 3a and 3b depict the reinforcing ridges 21 surrounding the bores 23. The ridges 21 have increased thickness of the elastic material forming the overshoe 10.

Figure 7:
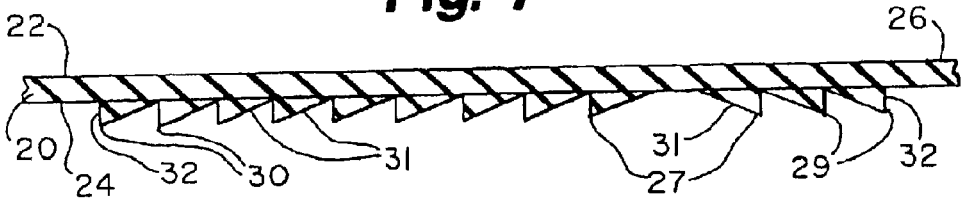
FIG. 7 is a plan view of the Section A–A' shown in FIG. 4.

Tread surface 24 includes gripping ridges 27 (FIGS. 2, 4, 4a, and 7). The gripping ridges 27 may be forward-pushing gripping ridges 29 and rearward-pushing gripping ridges 30. The gripping ridges 27 have a push-face 32 and a hypotenuse face 31. The height of the gripping ridge 27 is its maximum length perpendicular from the tread surface. Referring to FIG. 7, the gripping ridge 27 has a push-face 32 that is perpendicular to the outersole 20 and a hypotenuse face 31 that joins the push-face 32 to the outersole 20. The hypotenuse face 31 of a forward-pushing gripping ridge 29 faces substantially to the rear of shoe 5 so that push-face 32 is oriented to provide a surface area that gives much more traction to the user as they push their foot forward, as when attempting to stop or walk backwards. Hypotenuse face 31 of a rearward-pushing gripping ridge 30 faces substantially to the forward of shoe 5 so that push-face 32 is oriented to provide a surface area that gives traction to the user as the user pushes the foot rearward, as when walking forwards. The combination of opposite-facing directions of forward-pushing 29 and rearward-pushing 30 gripping ridges supply a higher degree of traction than if the ridges faced only one direction.

Gripping ridge 27 preferably has a height in the range of approximately three- to ten- sixty-fourths of an inch. The gripping ridges 27 may be shaped to have the cross-sectional profile of a right triangle (FIGS. 4, 4a and 7). The push-face 32 defines the height of the triangle and the hypotenuse face 31 joins the push-face 32 to the outersole 20.

The rearward portion of the outersole 28 includes an under-heel portion 50 that is disposed substantially beneath the heel of the shoe 8. The under-heel portion 50 may include two spikes 25 and gripping ridges 27 (FIG. 4). The width of the under-heel portion 50, the width being measured in the plane of the outersole 20, approximately along the outersole's longitudinal axis (see FIG. 4a), is preferably in the range of 0.85 to 1.5 inches.

Rearward portion 28 and forward portions 26 of outersole define central opening 34 (FIG. 4). Central opening 34 may be roughly square-shaped and configured to minimize the space between outersole 20 and shoe 5 that would otherwise form a pocket that might entrap ice or other unwanted debris.

Front-gripping portion 50 of the overshoe is configured to grip the forward toe portion 7 of the shoe and to be form-fitting to the shoe. It is continuous with outersole 20 and is shaped so that it maintains a shape that does not require a user to hold it open when inserting the toe of shoe 5 (FIGS. 1, 3, 5).

Front-gripping portion 50 is generally stretchable by a user because it is made of an elastic material. Front-gripping portion 50 includes stretch zones 57 that are sized to be especially elastically deformable by a user. The stretch zones 57 are disposed so that a user may readily stretch them while putting the overshoe 20 onto a shoe but so that the stretch zones 57 are not readily stretched in use while the user is walking. Openings 56 are used to define stretch zones 57.

Figure 5:
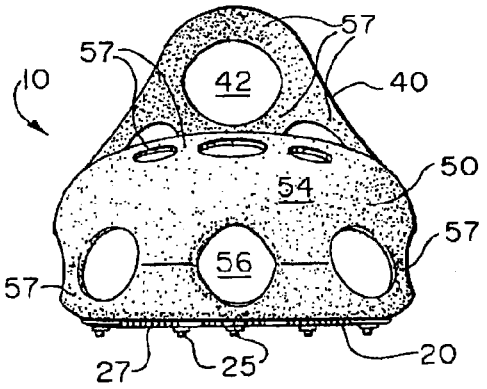
FIG. 5 is a front plan view of an anti-slip overshoe.

Front-gripping portion 50 may have five openings 56 that define six stretch zones 57 that are disposed at the region where the outersole 20 meets the front-gripping portion 50 (FIGS. 3–5). The stretch zones 57 are sized to allow optimal stretching and snugness of fit and are optimally approximately 0.5 inches in width at their narrowest points. Stretch zones 57 that allow for adjustment of the overshoe 20 in the shoe forward toe area 7 are also incorporated into the upper surface of the front-gripping portion 50 (FIG. 3).

The stretch zones 57 preferably each have an approximately equal width. The openings 56 also preferably each have an approximately equal width. Each of the openings 56 have a width that is greater than a width of each of the stretch zones 57.

Figure 6:
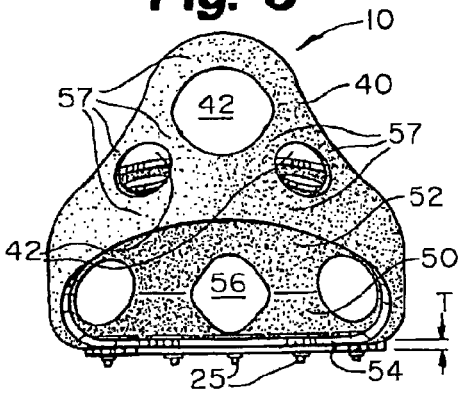
FIG. 6 is a rear plan view of an anti-slip overshoe.

The back-gripping portion 40 of the overshoe 20 is configured to grip the heel portion 8 of the shoe 5 and to be form-fitting to the shoe. It is continuous with the outersole 20 and is shaped so that it maintains a shape that does not require a user to hold it open when inserting the heel 8 of a shoe (FIGS. 1, 3, 6). The back-gripping portion 40 is generally stretchable by a user because it is made of an elastic material. The back-gripping portion 40 includes stretch zones 57 that are sized to be especially elastically deformable by a user.

The zones 57 are disposed so that a user may readily stretch the zone 57 while putting the overshoe 10 onto a shoe 5 but so that the zones 57 are not readily stretched while the user is walking. Openings 56 are used to define approximately seven stretch zones 57.

Figure 2:
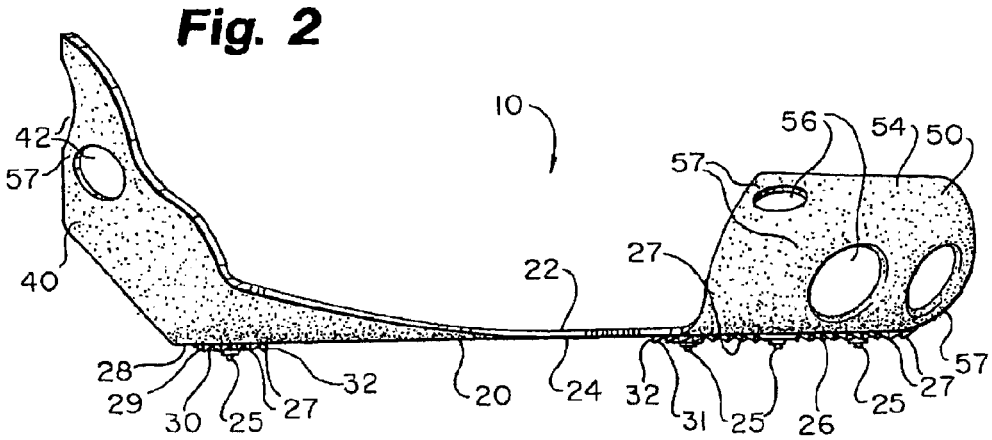
FIG. 2 is a right side elevational view of an anti-slip overshoe.

Referring to FIG. 6, with the left side of the diagram being the left side of shoe 5; stretch zones 57 are defined between left opening 42 and the left edge; between the left opening 42 and the bottom edge, between the left opening 42 and the opening 42 that is placed centrally in the back-gripping portion; right opening 42 and the right edge; between the right opening 42 and the bottom edge, between the right opening 42 and the opening 42 that is placed centrally in the back-gripping portion; and between the same central opening 42 in the back edge and the upper edge of the back gripping portion 40 (see also FIGS. 1, 2, and 5). The stretch zones 57 of the back portion 40 are sized to allow optimal stretching and snugness of fit and are preferably approximately three-eights inch in width at their narrowest points.

The width dimension, W in FIG. 4a, of the under-heel band 29 and the thickness, dimension T of FIG. 6 of the under-heel portion 54 and the under-ball portion 52 are preferably greater to increase durability of these critical areas.

Figure 8:
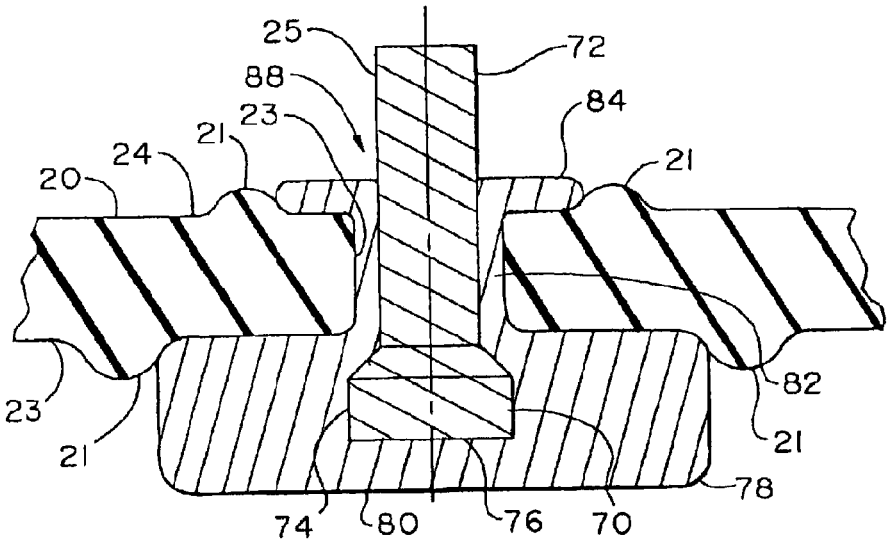
FIG. 8 is a sectional view of an alternative embodiment of a spike molded into a supporting button.
Figure 9:
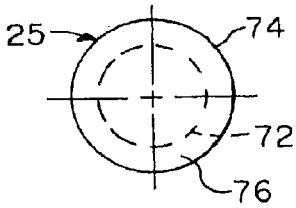
FIG. 9 is a bottom planform view of the spike of FIG. 8.
Figure 10:
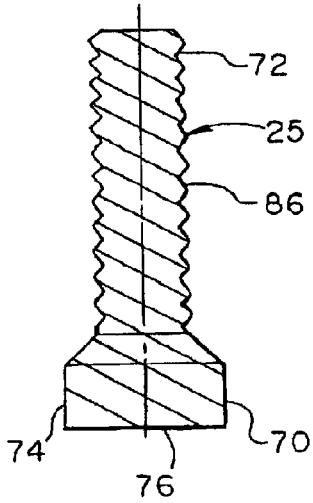
FIG. 10 is a sectional view of an alternative embodiment of a spike having a serrated shank.

Referring to FIGS. 8–10, two further embodiments of a spike 25 are depicted. The spike of FIGS. 8, 9 is formed of suitable material as indicated above that exhibits good grip and has good wear resistant qualities. The spike 25 has a head 70 and a shank 72. The head 70 presents a preferably circular outer margin 74 and has a generally flat top margin 76. The diameter of the head 70 is expanded to help prevent the spike 25 from pushing upward through to the shoe of the user as a result of use on hard surfaces. The spike 25 is molded into a button 78 of resilient material, such as nylon or the like. The button 78 has an expanded head 80 to support the spike 25 against the underside of the shoe of the user. The head 80 tapers to a reduced diameter neck 82. The diameter of the neck 82 is substantially equal to that of the bore 23 formed in the outer sole 20. The neck 82 expands to a rim 84, the rim 84 having a greater diameter than the neck 82.

In assembly, the spike 25 is set into the button 78 when the button is in a molten state. Upon setting of the button 78, the spike is fixed in the button 78. Referring to FIG. 10, the shank 72 of the spike 25 has serrations 86 formed on the surface thereof, the serrations 86 acting to form a better engagement with the surrounding button 78.

The button 78/spike 25 combination, comprising a spike assembly 88, is coupled to the outersole 20 by slightly stretching the bore 23, the button 78 with the spike embedded therein may be readily disposed in the bore 23 by pushing the rim 84 through the stretched bore 23. When the spike 25 has worn through use, the button 78 may be simply popped out of the bore 23 and a replacement button 78 with embedded spike 25 popped in.

Figure 11:
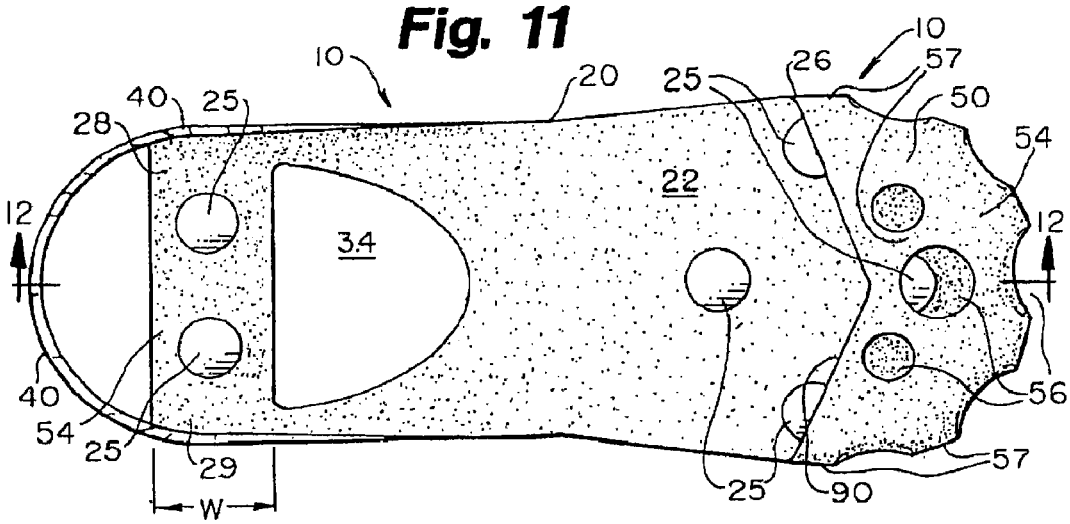
FIG. 11 is a top plan view of an alternative embodiment of an anti-slip overshoe.
Figure 12:
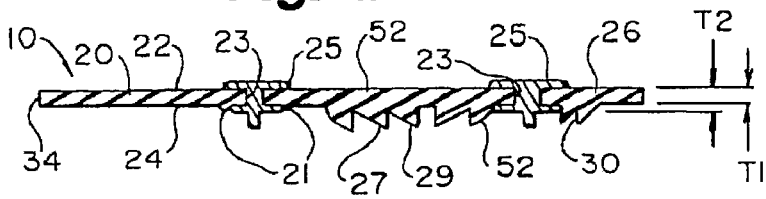
FIG. 12 is a section of the outersole only taken along the section line 12—12 of FIG. 11.
Figure 13:
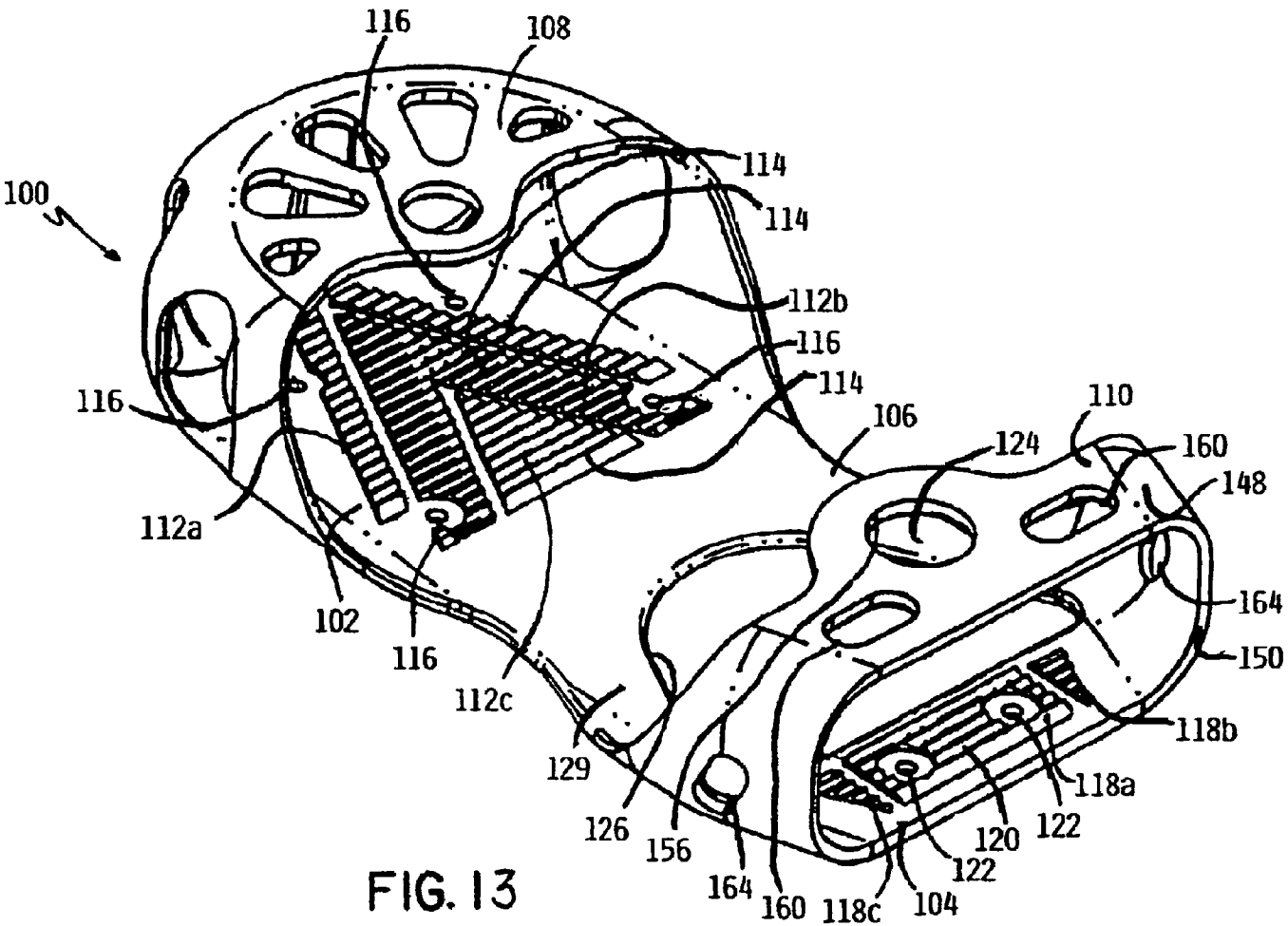
FIG. 13 is a perspective view of another embodiment of the anti-slip overshoe of the present invention depicted turned inside out such that the tread pattern is shown on the inside of the ball and heel portions of the overshoe.
Figure 14:
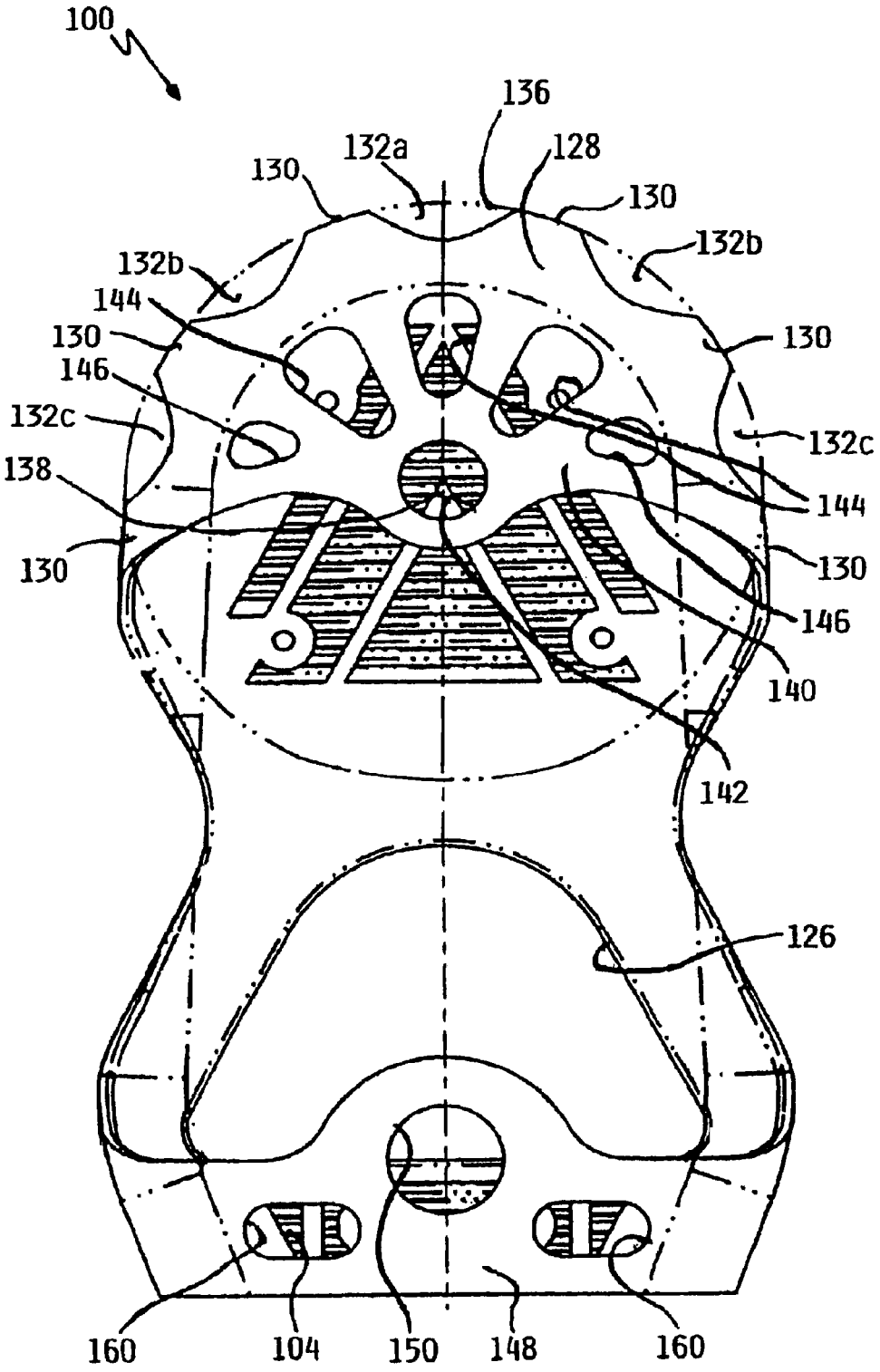
FIG. 14 is a top plan view of the overshoe of FIG. 13.
Figure 15:
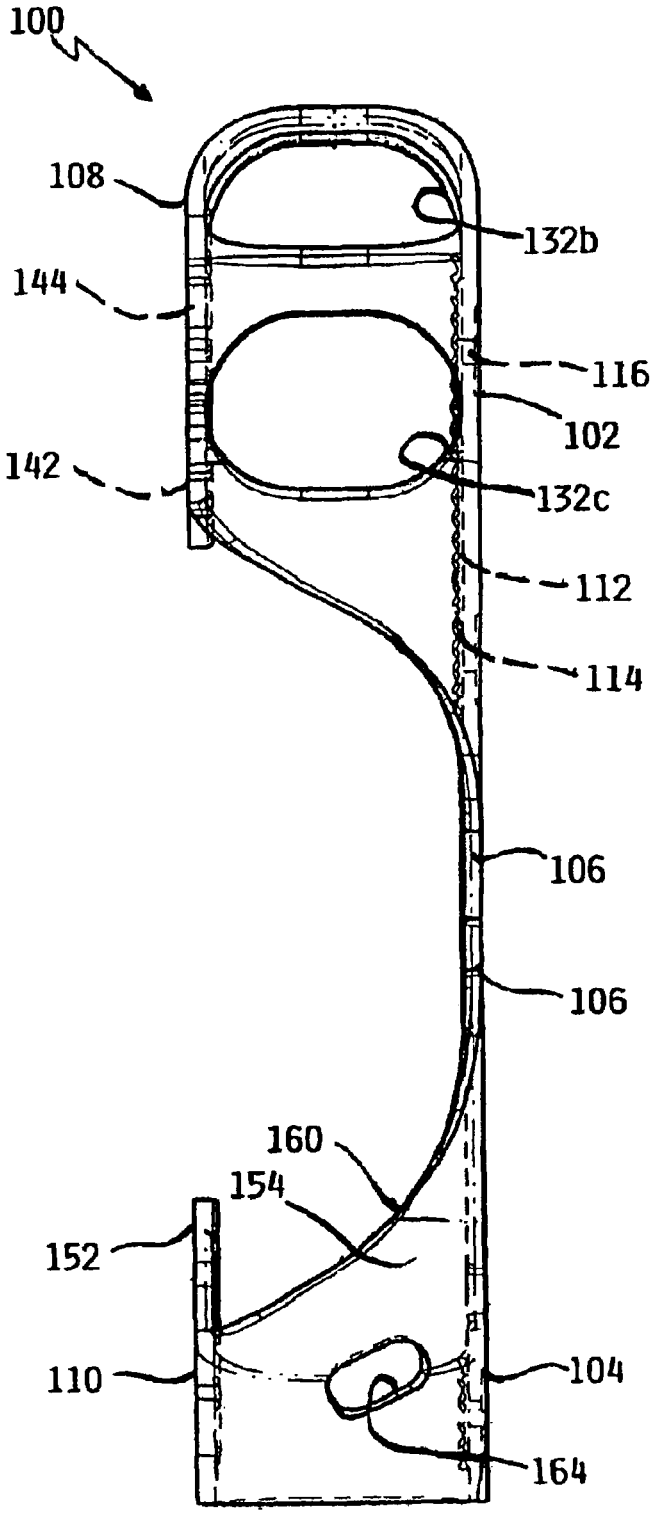
FIG. 15 is a side elevational view of the overshoe of FIG. 13.
Figure 16:
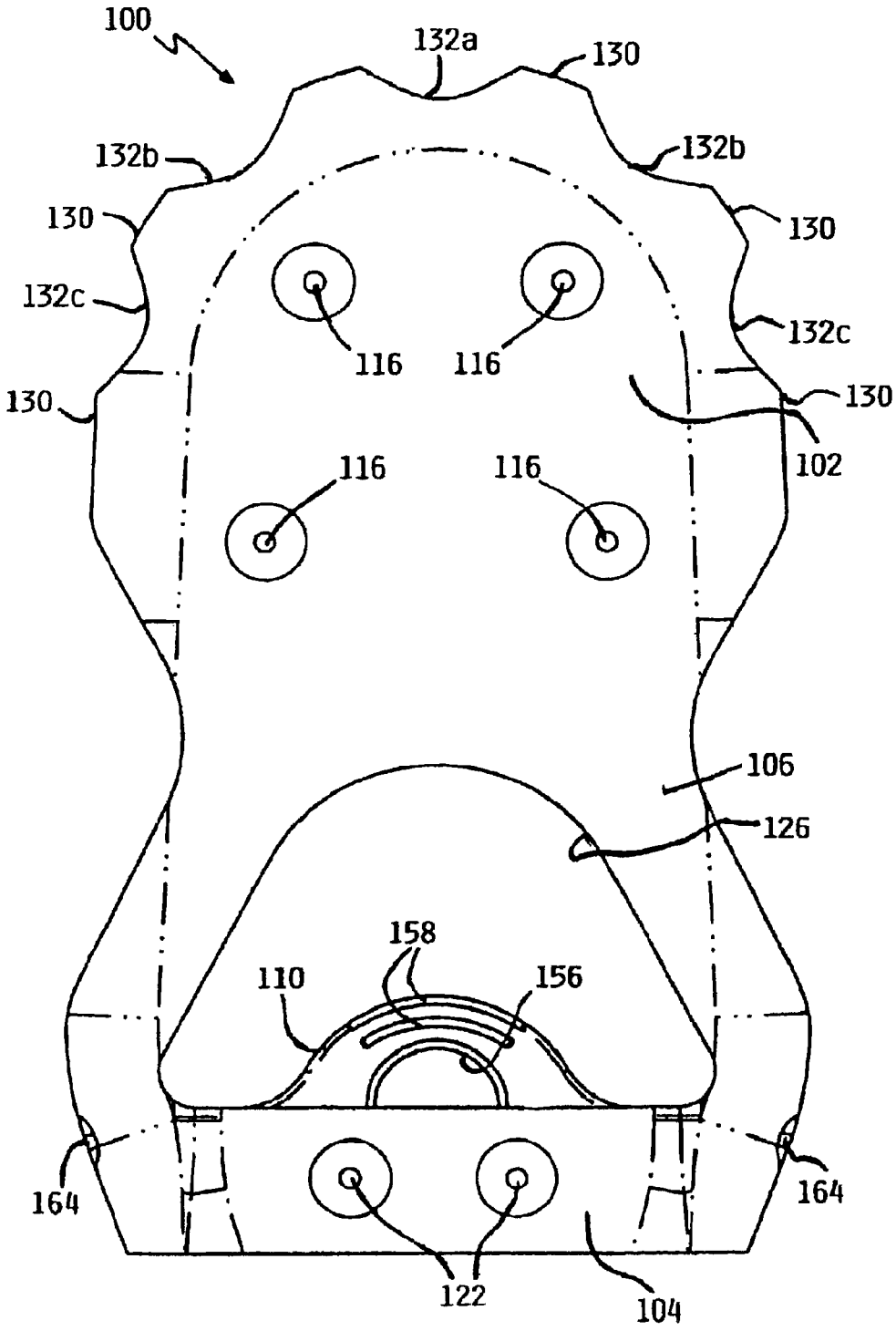
FIG. 16 is a bottom plan view of the overshoe of FIG. 13 showing the inside of the ball and heel portions of the avershoe.

Referring to FIGS. 11 and 12, a modified embodiment of the overshoe 10 is depicted. The overshoe 10 has an opening 34 that extends forward from the under-heel portion 54 in a generally elliptical shape. The front gripping portion 50 terminates in a rearward-most margin 90 that is radiused, as distinct from having a point in the above embodiments. The outer-sole 20 is formed of material having at least two different thicknesses. The thickness $T_2$ in the region of greatest contact with the ground is formed in greater thickness than the thickness $T_1$. This is true in both the under ball portion 52 and the under heel portion 54 of the overshoe 10.

A further embodiment of the anti-slip overshoe of the present invention is shown generally at 100 in FIGS. 13–16. The anti-slip overshoe 100 of this embodiment is particularly suited for use with boots. The anti-slip overshoe 100 has five major subcomponents: ball 102, heel 104, connecting portion 106, overtoe 108, and overheel 110.

The ball 102 has a tread pattern 112 formed thereon. The tread pattern 112 is comprised of two chevrons, 112a, b, and a triangle 112c. The chevrons 112a, b and the triangle 112c each have a pattern of spaced apart ridges 114. Preferably, the ridges 114 of the chevron 112a and the triangle 112c face forward while the ridges 114 of the chevron 112b faces rearward in order to provide traction in both directions.

Four spike apertures 116 are disposed about the tread pattern 112. Each of the spike apertures 112 facilitates removably fixing a downward directed spike (not shown) in the respective aperture 116 in a manner as noted above. The spikes 116 are preferably oriented in a trapezoid configuration with a spacing between two forward spikes being less than spacing between two rearward spikes.

The heel 104 is disposed immediately rearward of the ball 102. While the ball 102 is designed to generally underlie the ball of the foot of a wearer of the anti-slip overshoe 100, the heel 104 is designed to underlie the heel of a wearer of the anti-slip overshoe 100.

The heel 104 has a downward directed tread pattern 118. The tread pattern 118 in a preferred embodiment has a rectangle pattern 118a flanked by two triangular patterns 118b, c. Each of the rectangular pattern 118a and triangular patterns 118b, c has a plurality of spaced apart, angled ridges 120. The ridges 120 of the rectangular pattern 118a are directed in the same direction as the ridges 114 of chevron 112a and triangle 112c. The ridges 120 of the triangular patterns 118b, c are directed in the same direction as the ridges 114 of the chevron 112b. In this manner, the ridges complement the forward and rearward traction characteristics exhibited by the tread pattern 112.

A pair of spaced apart spike apertures 122 are disposed in the rectangular pattern 118a and have the same function as the splice apertures 116 described above.

The connecting portion 106 extends between the ball 102 and the heel 104. The connecting portion 106 is comprised of two spaced apart side straps 124. Each side strap 124 is at an integral with the ball 102 and heel 104, respectively. The side straps 124 define a generally triangular shaped aperture 126 therebetween.

The next major subcomponent of the anti-slip overshoe 100 is the overtoe component 108. The overtoe component is coupled to the ball 102 by a plurality of spaced apart straps 130. As compared with prior art overshoes, the straps 130 are relatively narrow to accommodate stretching such that the anti-slip overshoe 100 may be used with a plurality of different types of shoes, including the rounded, bulbous pac type boots and including more pointed cowboy type boots.

A plurality of apertures 132 are defined between the straps 130. Preferably, there are five apertures 132 defined by six straps 130. A first aperture is centered on the center line 134 of the anti-slip overshoe 100 at the apex of the anti-slip overshoe 100.

Two additional apertures 132 are arrayed on either side of the apex aperture 132. Preferably, the overtoe body 128 is a shape that is generally semi-circular, defined by a semi-circle 136 centered on an origin 138. The two apertures 132 deployed on either side of the apex aperture 132 are preferably equiangularly displaced from the center line 134. A first aperture 132 on either side of the center line 134 are disposed at an angle between 30 and 50 degrees and preferably substantially 39 degrees from the center line 134. The second aperture 132 on either side of the center line 134 is preferably disposed at angle of between 30 and 50 degrees from the first aperture and is preferably disposed at an angle of substantially 39 degrees from the first aperture 132.

The top portion 140 of the overtoe body 128 additionally includes a plurality of apertures defined therein. The first such aperture is a center aperture 142 defined around the origin 138. In addition to facilitating stretching, the center aperture is useful for pulling the overheel 108 over the heel portion of a shoe by extending a finger at least partially into the first aperture.

Three radial apertures 134 are centered on radaii extending from the origin 138. A first radial aperture 144 is centered on the center line 134. A further radial aperture 144 is equiangularly disposed on either side of the first radial aperture 144. Preferably, the radius on which the second two radial apertures 144 are disposed is coincident with the radius on which the first two apertures 132 are displaced from the center line 134. A first two side apertures 146 are defined adjacent to a respective angularly displaced radial aperture 144. Inclusion of the circular aperture 142, radial apertures 144, and side apertures 146 in the top portion 140 defines a plurality of stretch zones between the aforementioned apertures that aid in the overtoe component 108 stretching to accommodate a great variety of different shoe toe shapes are previously discussed.

The final major subcomponent of the anti-slip overshoe 100 is the overheel component 110. The overheel 110 is comprised of a single strap 148 that is displaced from the heel 104. An aperture 150 is defined between the heel 104 and the strap 148.

The strap 148 is comprised of a rear portion 152 and two descending connecting portions 154 that are connected to the heel 104.

The rear portion 152, which rides on the rear of the heel area of the shoe on which the anti-slip overshoe 100 is disposed, includes a center aperture 156 that is preferably disposed on the centerline 134. The center aperture 156 is preferably circular in shape. In addition to facilitating stretching, the center aperture is useful for pulling the overheel 108 over the heel portion of a shoe by extending a finger at least partially into the first aperture.

A plurality of curved ridges 158 are disposed adjacent to the center aperture 156. The ridges 158 facilitate grasping the rear portion 152 and pulling it up over the rear portion of the heel of the shoe. A pair of oval apertures 160 are displaced from the center aperture 156, one oval aperture 160 on each side of the center aperture 156.

The connecting portion 154 has a tapering margin 162 that widens as the side portion 154 joins the connecting portion 106. Each of the side portions 154 has an oval aperture 164 defined therein.

FIGS. 17–28 depict four different embodiments of an alternate grip pattern formed on the ball 102 of the anti-slip overshoe 100. Each of the tread patterns 112 is circular in shape having a plurality of generally circular ridges 114. Preferably, the tread pattern 112 of FIGS. 17–28 is concentric with the origin 138. The tread patterns 112 of FIGS. 17–28 include four spike apertures 116 generally disposed in a rectangular shape and fifth spike aperture 116a disposed at the origin of the tread pattern 112. An advantage of the tread patterns 112 of FIGS. 17–28 is that the ridges 114 are in all cases angled outward with respect to the origin 138 and thereby provide for improved traction in all quadrants radiating from the origin 138. Additionally, traction on ice is improved by including a fifth spike disposed in the spike aperture 116a.

Figure 17:
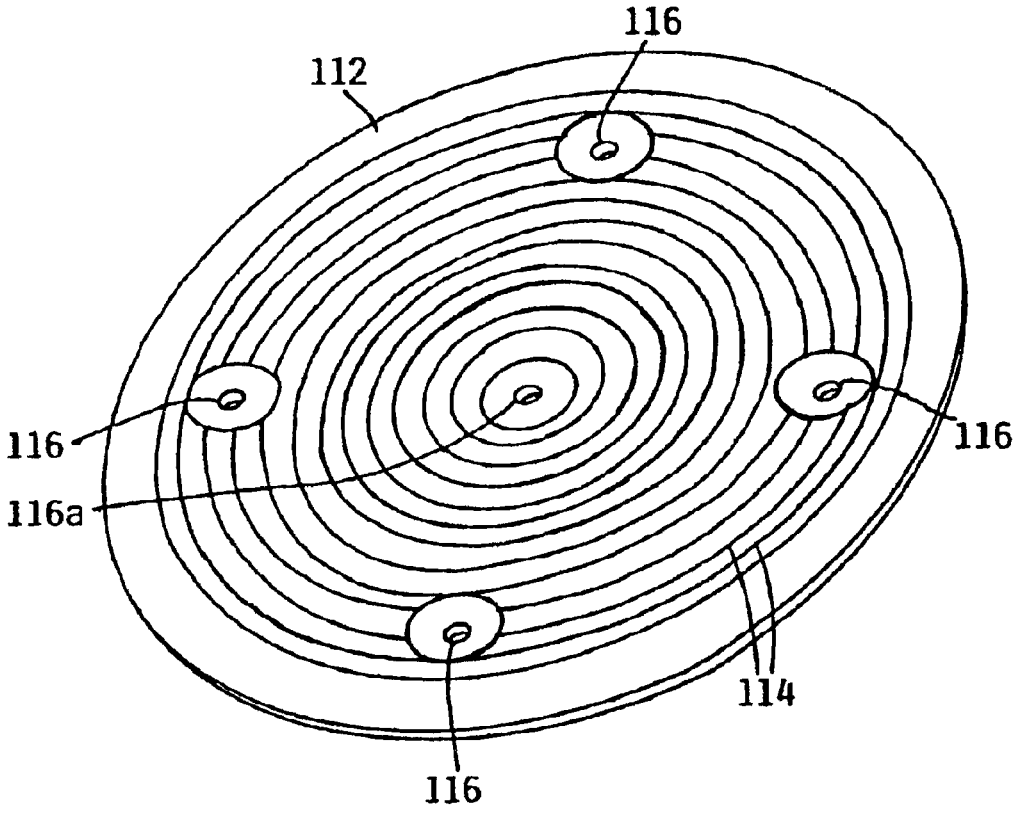
FIG. 17 is a perspective view of an alternative pattern of the tread imposed on the ball of the overshoe.
Figure 18:
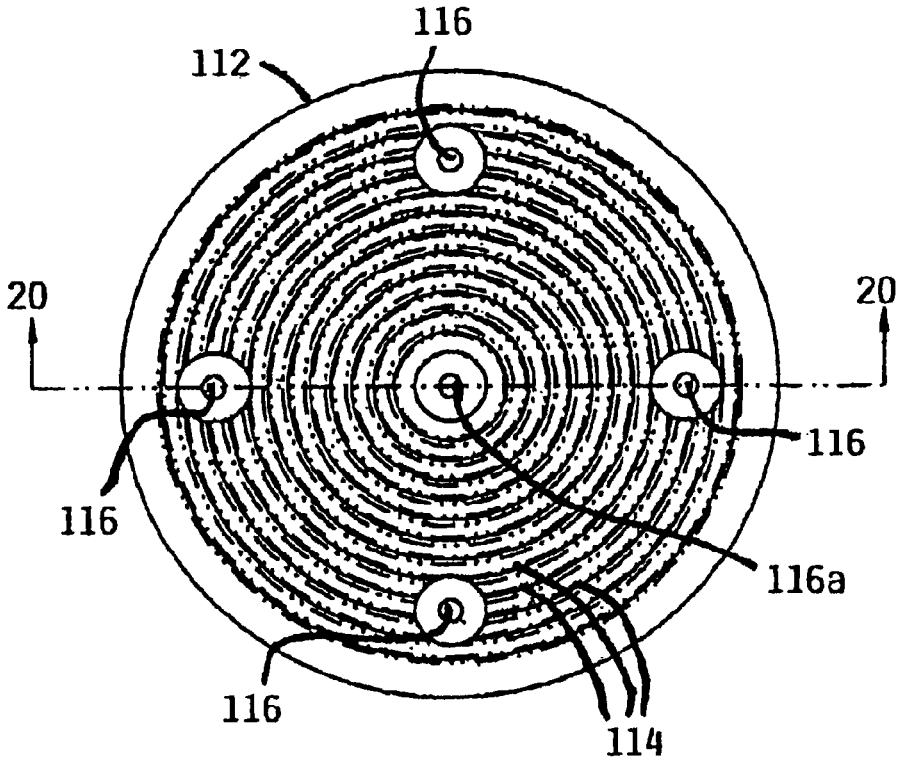
FIG. 18 is a plan view of the tread pattern of FIG. 17.
Figure 19:
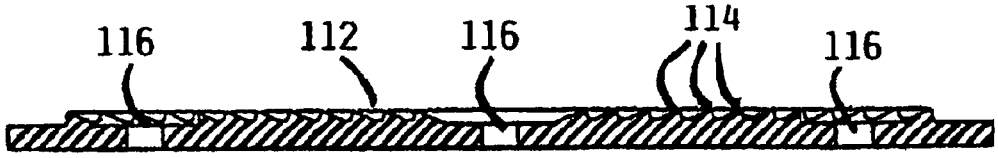
FIG. 19 is a sectional view of the tread pattern taken along the section line A—A of FIG. 18.

Referring to the embodiment of FIGS. 17–19, the ridges 114 are circular concentric the spike aperture 116a. Two of the concentric ridges 114 are interrupted by the spike apertures 116.

Figure 20:
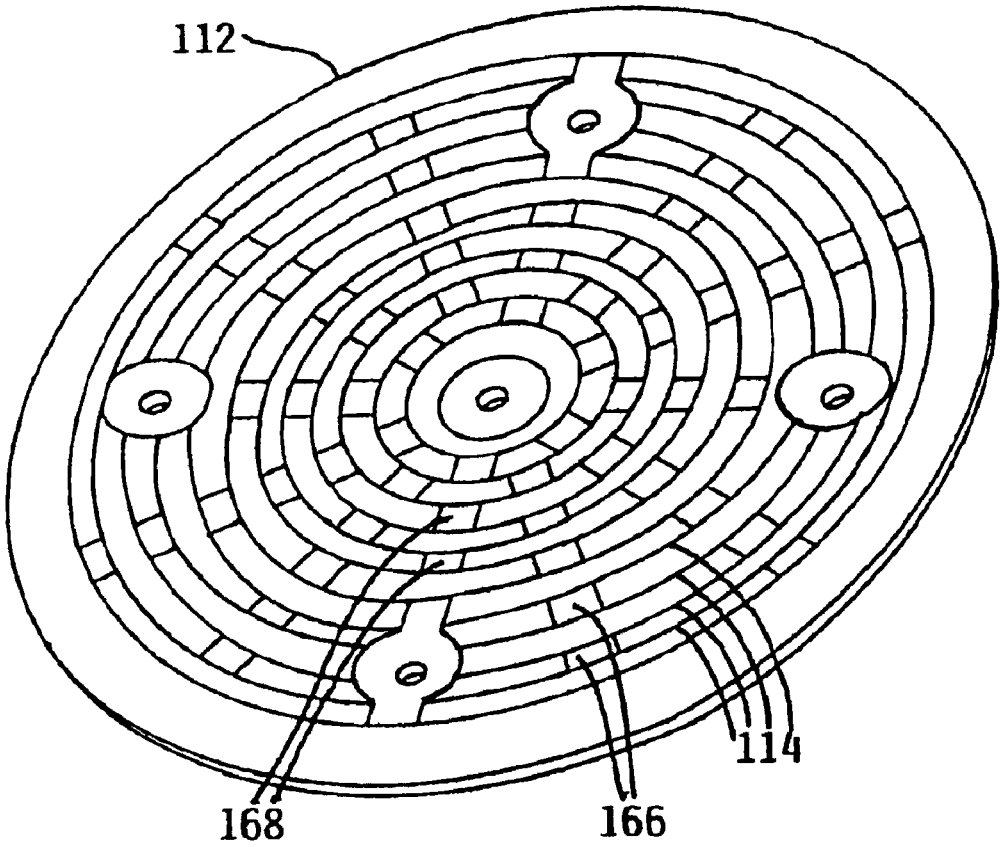
FIG. 20 is a perspective view of an alternative pattern of the tread imposed on the ball of the overshoe.
Figure 21:
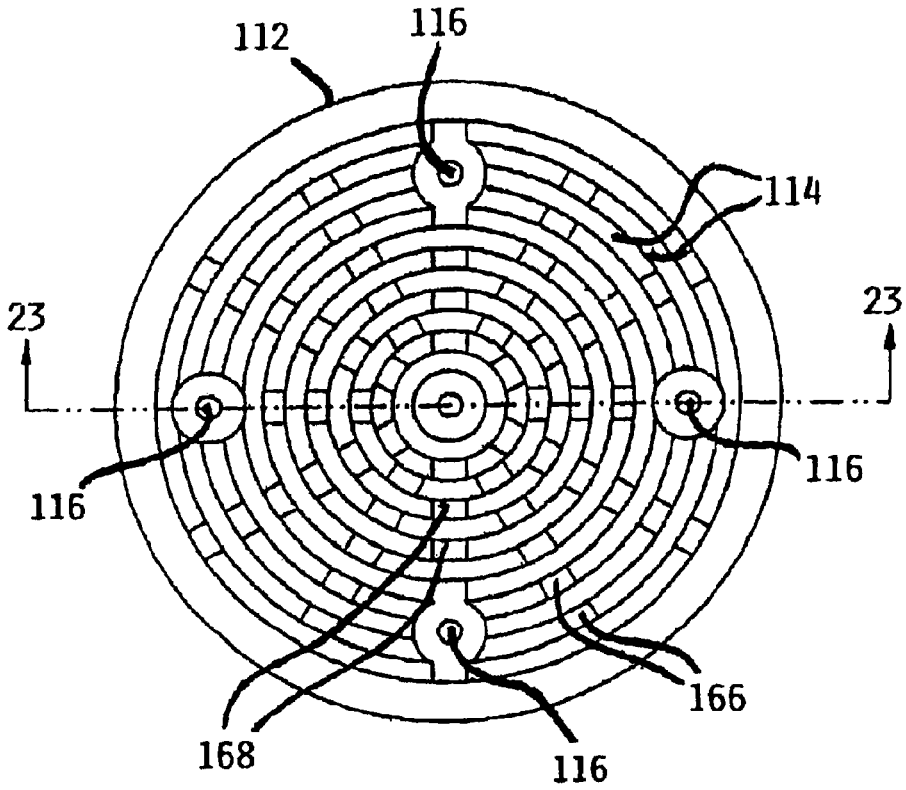
FIG. 21 is a plan view of the tread pattern of FIG. 20.
Figure 22:
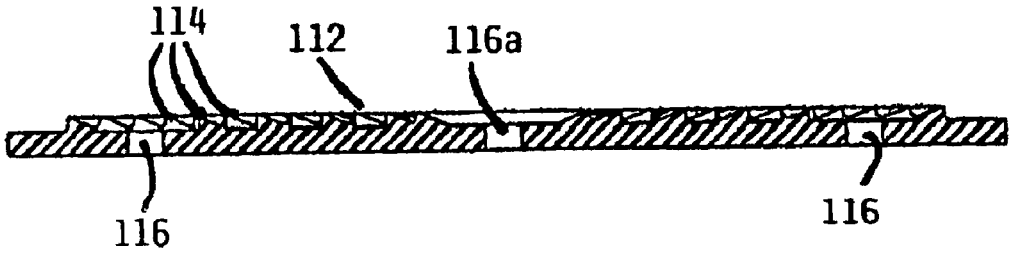
FIG. 22 is a sectional view of the tread pattern taken along the section line A—A of FIG. 21.

FIGS. 20–22 depict a second circular tread pattern 112. In the embodiment of FIGS. 20–22, every other concentric ridge 114 is interrupted by spaces 166. The spaces 166 emanate radially from the center of the circular tread pattern 112. There are six radial sets of spaces 166 disposed equiangularly around the origin of the circular tread pattern 112.

A second set of spaces 168 also radiates from the origin of the circular tread pattern 112. There are also six sets of spaces 168 radiating from the origin. The spaces 168 intersect every other circular ridge 114, but not the circular ridges 114 that are intersected by the spaces 166.

Figure 23:
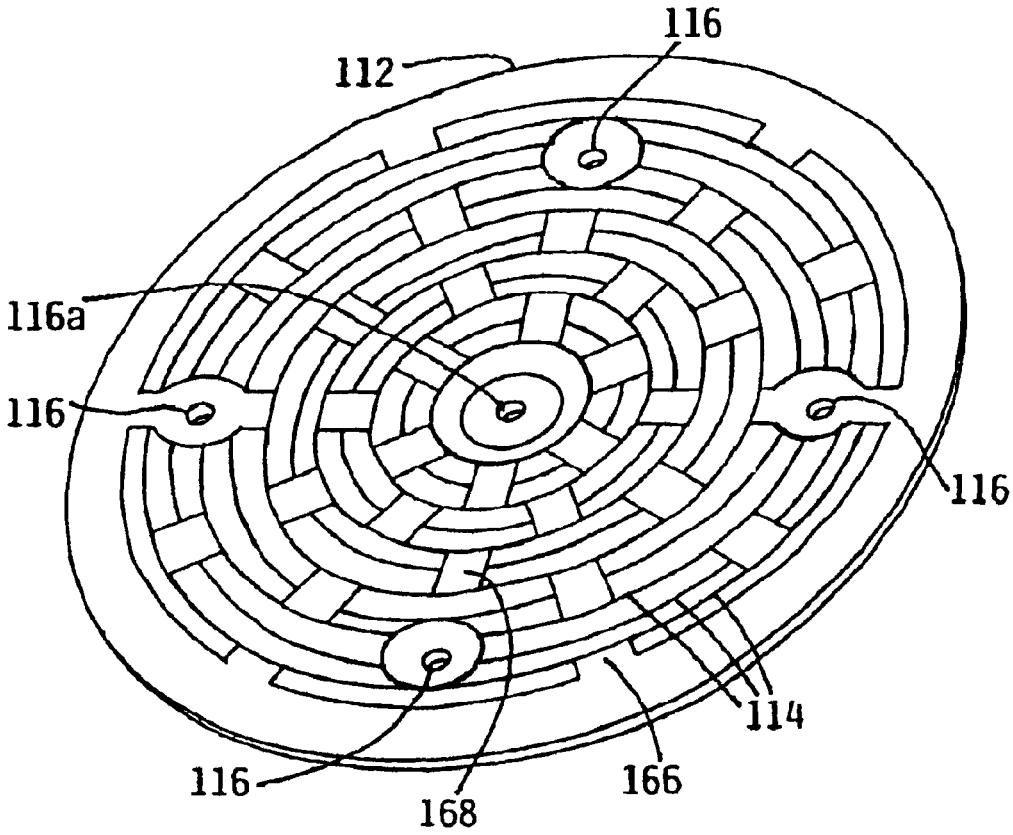
FIG. 23 is a perspective view of an alternative pattern of the tread imposed on the ball of the overshoe.
Figure 24:
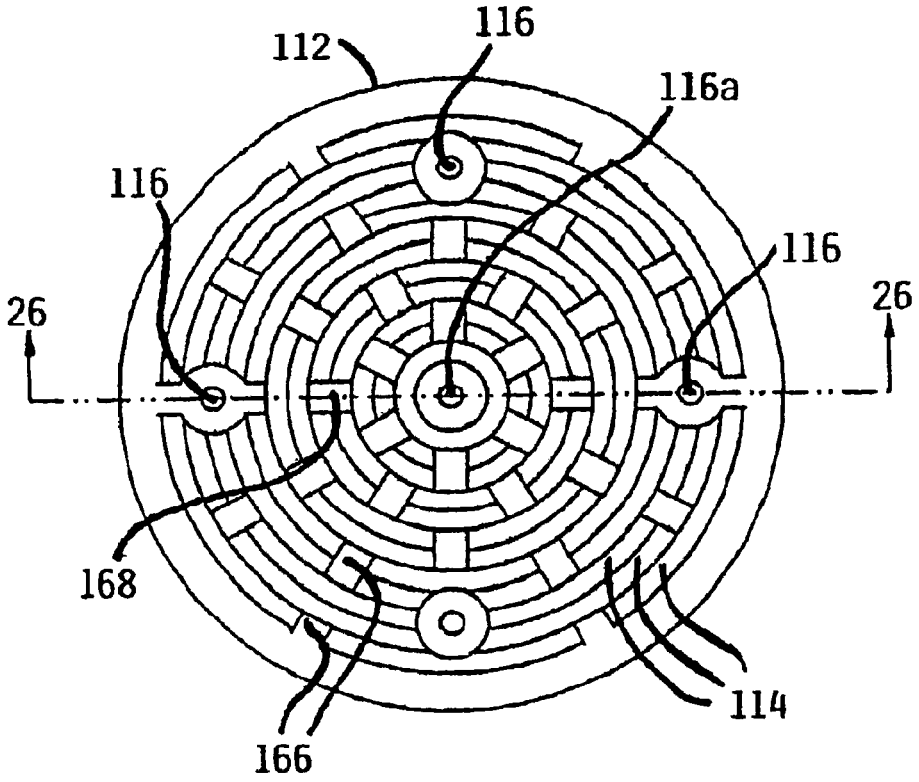
FIG. 24 is a plan view of the tread pattern of FIG. 23.
Figure 25:
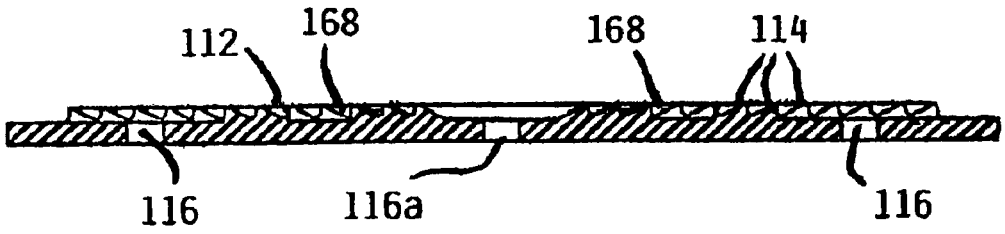
FIG. 25 is a sectional view of the tread pattern taken along the section line A—A of FIG. 24.
Figure 26:
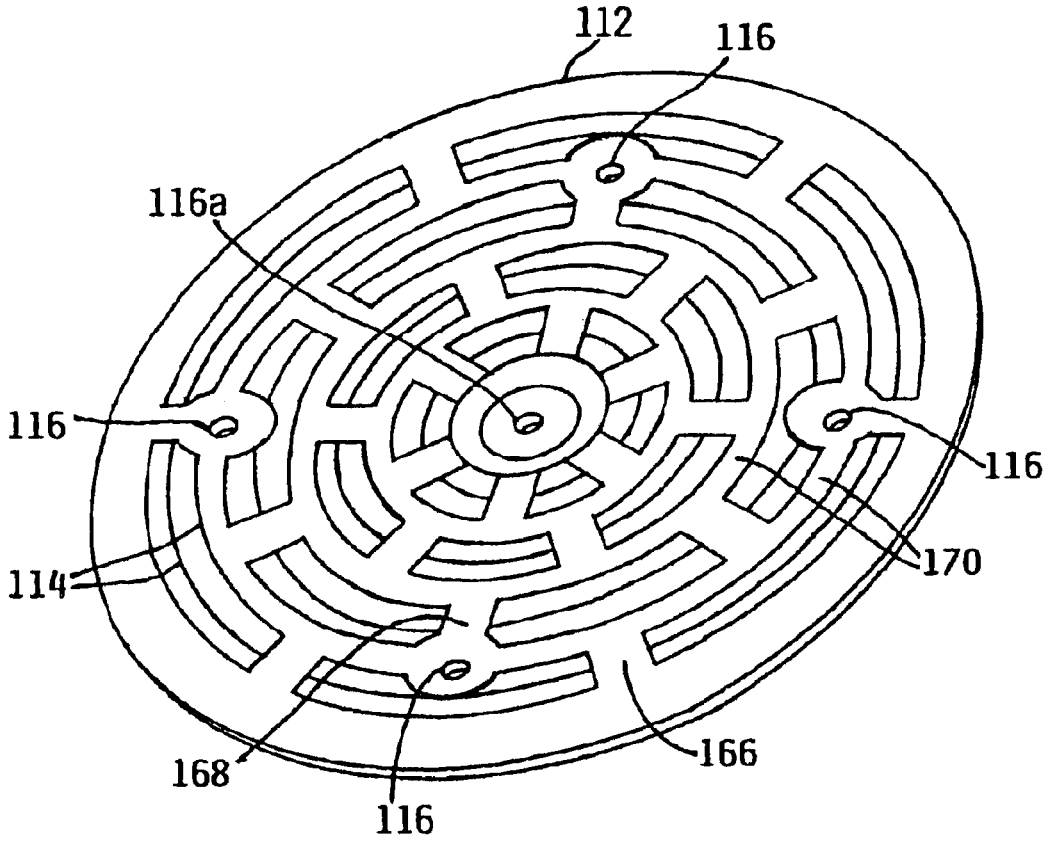
FIG. 26 is a perspective view of an alternative pattern of the tread imposed on the ball of the overshoe.
Figure 27:
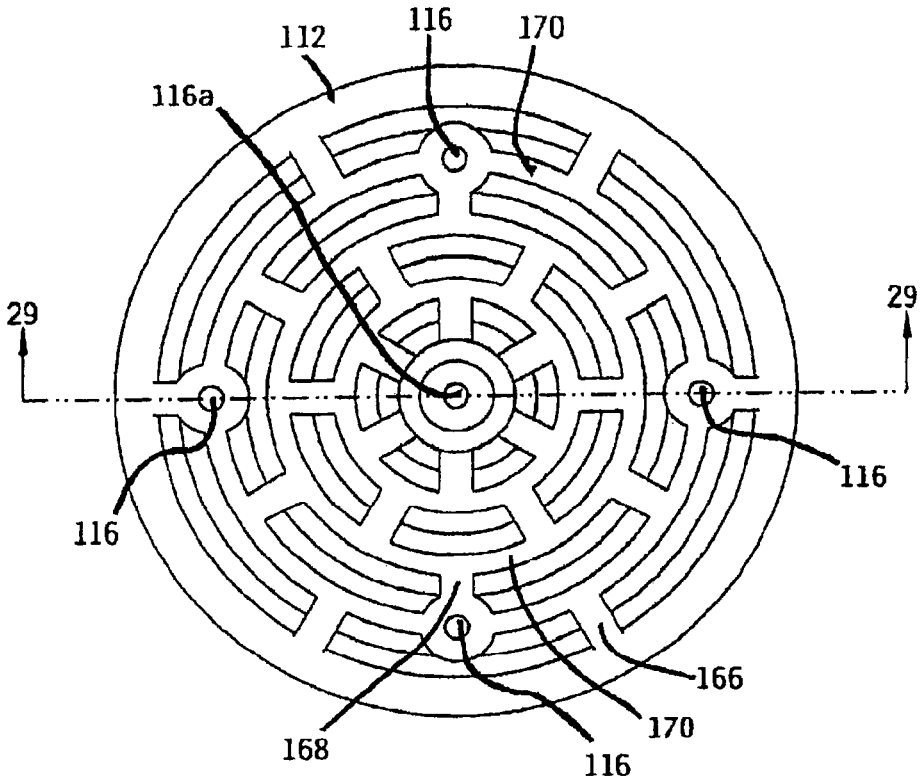
FIG. 27 is a plan view of the tread pattern of FIG. 26.
Figure 28:
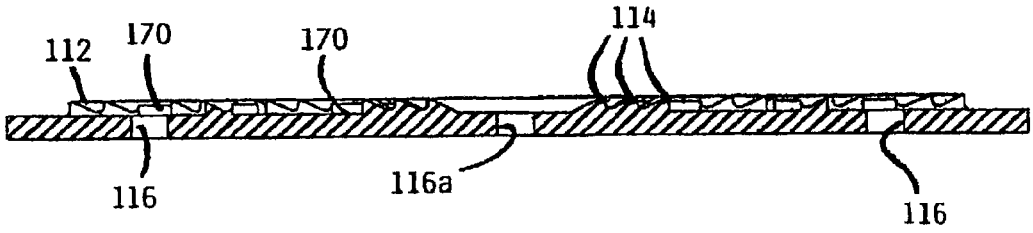
FIG. 28 is a sectional view of the tread pattern taken along the section line A—A of FIG. 27.

FIGS. 23–25 depict a further embodiment of a circular tread pattern 112. In this circular tread pattern 112, the spaces 166, 168 intersect adjacent pairs of circular ridges 114, the spaces 166 intersecting a first pair and the spaces 168 intersecting an adjacent pair of circular ridges 114. A final circular tread pattern 112 is depicted in FIGS. 26–28. In this embodiment, circular spaces 170 are included in addition to the spaces 166, 168 of the embodiment of FIGS. 23–25. The circular spaces 170 are concentric with the origin of the circular tread pattern 112 and are disposed between adjacent pairs of ridges 114.

It will be obvious to those skilled in the art that other embodiments in addition to the ones described herein are indicated to be within the scope and breadth of the present application. Accordingly, the applicant intends to be limited only by the claims appended hereto.

What is claimed is:

1. An anti-slip overshoe that fits over a shoe and enhances contact with the ground, the shoe having a forward toe portion, a rearward heel portion and a bottom for engaging the ground, the anti-slip overshoe comprising:

a single flexible elastic piece having a ball, a heel, a connecting portion, an over-toe component, and an over-heel component;

the ball and heel being connected by the connecting portion and each of the ball and heel having a tread pattern, the tread pattern having a plurality of gripping ridges and a plurality of spikes;

the over-toe component being operably coupled to the ball with a plurality of stretch zones so that the over-toe component conformingly engages the shoe toe portion, wherein the over-toe component has a plurality of apertures, one of which extends between each of the stretch zones, and wherein the plurality of stretch zones each have an approximately equal width; and the over-heel component being operably coupled to the heel and being adapted to conformingly engage the shoe heel portion, the over-heel component having a plurality of apertures and having a plurality of stretch zones.

2. The overshoe of claim 1 wherein the plurality of apertures each have an approximately equal width.

3. The overshoe of claim 2 wherein wherein each of the plurality of apertures have a width that is greater than a width of each of the plurality of stretch zones.

4. The overshoe of claim 2 wherein the plurality of apertures comprises five apertures formed proximate the intersection of the ball and the over-toe component.

5. The overshoe of claim 2 wherein there are apertures formed proximate the intersection of the ball and the over-toe component are disposed in a substantially semi-circular disposition.

6. The overshoe of claim 1 wherein each of the spikes are removably disposed in a respective bore defined in the ball and heel and are secured therein so that they may be readily replaced by a user.

7. The overshoe of claim 1 wherein the over-toe component includes an over-toe body, the over-toe body having a plurality of apertures defined therein, a plurality of stretch zones being formed between adjacent over-toe body apertures.

8. The overshoe of claim 7 wherein at least three of the over-toe body apertures are equiangularly, radially disposed relative to an origin of a semi-circle.

9. The overshoe of claim 7 wherein a circular over-toe body aperture is radially disposed relative to an origin of a semi-circle.

10. The overshoe of claim 1 wherein a first portion of the ball gripping ridges are angled in a first direction and disposed in a first chevron arrangement and a second portion of the ball gripping ridges are angled in an opposed second direction and disposed in a second chevron arrangement.

11. The overshoe of claim 1 wherein the ball gripping ridges are radially disposed relative to an origin of a circle in a pattern of concentric circles with increasing radii.

12. The overshoe of claim 11 wherein the gripping ridges are formed in continuous circles.

13. The overshoe of claim 11 wherein the gripping ridges are formed in circles selectively interrupted by spaces.

14. The overshoe of claim 13 wherein every other gripping ridge is selectively interrupted by spaces.

*15. An anti-slip overshoe for covering a shoe, comprising:*

*a toe portion for disposing around a toe area of the shoe, the toe portion having an over-toe component, and a tread pattern formed on a bottom of the toe portion with a plurality of ridges oriented in a first direction and includes a plurality of removable gripping protrusions spaced about the tread pattern, the toe portion further having a plurality of apertures symmetrically spaced around a front of the toe area of the shoe separated by a plurality of stretch zones, the stretch zones being configured so that the toe portion conformingly engages the toe area of the shoe and having an approximately equal width, the plurality of apertures each having an approximately equal width, one of the plurality of apertures extending between each of the stretch zones; and*

*a heel portion integrally molded with the toe portion for disposing around a heel area of the shoe, the heel portion having a tread pattern formed on a bottom of the heel portion from a plurality of ridges oriented in a second direction and including a plurality of removable gripping protrusions spaced about the tread pattern, the heel portion further having a plurality of apertures symmetrically spaced around the heel portion of the shoe separated by a plurality of stretch zones.*

*16. The anti-slip overshoe of claim 15, wherein each of the plurality of apertures has a width that is greater than a width of each of the plurality of stretch zones.*

*17. The overshoe of claim 15, wherein the plurality of apertures around the heel portion each have approximately equal width.*

*18. The anti-slip overshoe of claim 15, wherein the plurality of apertures around the toe portion has at least five apertures symmetrically formed around the toe area of the shoe, the at least five apertures being separated by the plurality of stretch zones to provide flexibility for mounting the anti-slip overshoe to the shoe.*

*19. The anti-slip overshoe of claim 15, wherein each of the plurality of gripping protrusions includes a removable spike disposed in a bore within the toe portion or heel portion.*

*20. The anti-slip overshoe of claim 15, wherein each of the plurality of gripping protrusions is a spike.*

*21. The anti-slip overshoe of claim 15, wherein the tread pattern of the toe portion is circular or V-shaped.*

*22. An anti-slip overshoe, comprising:*

*a toe portion and a heel portion molded into an integral unit;*

*wherein the toe portion includes an over-toe component and has a tread pattern and a plurality of removable gripping protrusions, the toe portion further having a plurality of symmetrically spaced apertures separated by a plurality of stretch zones so that the over-toe component conformingly engages a toe portion of a shoe, the plurality of stretch zones each having an approximately equal width; and*

*wherein the heel portion has a tread pattern and a plurality of removable gripping protrusions.*

*23. The anti-slip overshoe of claim 22, wherein the plurality of apertures each have approximately equal width.*

*24. The anti-slip overshoe of claim 22, wherein each of the plurality of apertures has a width that is greater than a width of each of the plurality of stretch zones.*

*25. The anti-slip overshoe of claim 22, wherein the plurality of apertures around the toe portion has at least five sym-*

*metrically formed apertures which are separated by the plurality of stretch zones to provide flexibility for mounting the anti-slip overshoe.*

*26. The anti-slip overshoe of claim 22, wherein each of the plurality of gripping protrusions includes a removable spike disposed in a bore within the toe portion or heel portion.*

*27. The anti-slip overshoe of claim 22, wherein each of the plurality of gripping protrusion is a spike.*

*28. The anti-slip overshoe of claim 22, wherein the spike is metallic.*

*29. The anti-slip overshoe of claim 22, wherein the tread pattern of the toe portion is circular with a plurality of ridges.*

*30. The anti-slip overshoe of claim 22, wherein the tread pattern of the toe portion is V-shaped with a plurality of ridges.*

*31. An anti-slip overshoe, comprising:*

*a toe portion and heel portion formed into an integral unit;*

*wherein the toe portion includes an over-toe component and has a tread pattern formed on a bottom of the toe portion and includes a plurality of removable spikes, the toe portion further having a plurality of symmetrically spaced apertures and being separated by a plurality of stretch zones, the stretch zones being configured so that the over-toe component conformingly engages a toe portion of a shoe, the stretch zones each having an approximately equal width; and*

*wherein the heel portion has a tread pattern formed on a bottom of the heel portion and includes a plurality of removable spikes, the heel portion further having at least one aperture in the heel portion of the shoe.*

*32. The anti-slip overshoe of claim 31, wherein the plurality of apertures each have approximately equal width.*

*33. The anti-slip overshoe of claim 31, wherein each of the plurality of apertures has a width that is greater than a width of each of the plurality of stretch zones.*

*34. The anti-slip overshoe of claim 31, wherein the plurality of apertures around the toe portion has at least five symmetrically formed apertures, the at least five apertures being separated by the plurality of stretch zones to provide flexibility for mounting the anti-slip overshoe.*

*35. The anti-slip overshoe of claim 31, wherein the plurality of spikes are disposed in bores within the toe portion and heel portion.*

*36. The anti-slip overshoe of claim 31, wherein the spike is metallic.*

*37. The anti-slip overshoe of claim 31, wherein the tread pattern is circular with a plurality of ridges.*

*38. The anti-slip overshoe of claim 31, wherein the tread pattern is V-shaped with a plurality of ridges.*

*39. An anti-slip overshoe, comprising:*

*a toe portion and a heel portion molded into an integral unit, wherein the toe portion includes an over-toe component and has a tread pattern and a plurality of removable gripping protrusions, the toe portion further having a plurality of symmetrically spaced apertures separated by a plurality of stretch zones so that the over-toe component conformingly engages a toe portion of a shoe, the plurality of stretch zones each having an approximately equal width.*

*40. The anti-slip overshoe of claim 39, wherein the heel portion has a tread pattern and a plurality of removable gripping protrusions.*

*41. The anti-slip overshoe of claim 40, wherein each of the plurality of gripping protrusions includes a removable spike disposed in a bore within the toe portion or heel portion.*

*42. The anti-slip overshoe of claim 39, wherein the tread pattern of the toe portion is circular with a plurality of ridges.*

*43. The anti-slip overshoe of claim 39, wherein the tread pattern of the toe portion is V-shaped with a plurality of ridges.*

* * * * *